(12) United States Patent
Suzuki

(10) Patent No.: US 8,008,880 B2
(45) Date of Patent: Aug. 30, 2011

(54) MOTOR CONTROLLER AND ELECTRIC POWER STEERING APPARATUS

(75) Inventor: Hiroshi Suzuki, Okazaki (JP)

(73) Assignee: JTekt Corporation, Osaka-shi (JP)

( * ) Notice: Subject to any disclaimer, the term of this patent is extended or adjusted under 35 U.S.C. 154(b) by 538 days.

(21) Appl. No.: 12/209,524

(22) Filed: Sep. 12, 2008

(65) Prior Publication Data

US 2009/0079371 A1    Mar. 26, 2009

(30) Foreign Application Priority Data

Sep. 26, 2007 (JP) ................. 2007-249612

(51) Int. Cl.
*B62D 5/04* (2006.01)
*B62D 6/00* (2006.01)

(52) U.S. Cl. ............. 318/400.23; 318/400.02; 318/632; 318/609

(58) Field of Classification Search .......... 318/611, 318/623, 610, 629, 632, 700, 400.02, 400.23, 318/400.24, 609; 388/906

See application file for complete search history.

(56) References Cited

U.S. PATENT DOCUMENTS

| | | | | |
|---|---|---|---|---|
| 3,737,747 A | * | 6/1973 | Krauer | 318/717 |
| 4,053,876 A | * | 10/1977 | Taylor | 340/529 |
| 4,251,846 A | | 2/1981 | Pearson et al. | |
| 4,409,507 A | * | 10/1983 | Godwin | 310/205 |
| 4,532,567 A | | 7/1985 | Kade | |
| 4,611,293 A | * | 9/1986 | Hatch et al. | 702/92 |
| 4,697,130 A | | 9/1987 | Dadpey et al. | |
| 5,365,153 A | | 11/1994 | Fujita et al. | |
| 5,488,281 A | | 1/1996 | Unsworth et al. | |
| 5,689,170 A | | 11/1997 | Ishikawa | |
| 5,752,209 A | | 5/1998 | Nishimoto et al. | |
| 6,037,741 A | | 3/2000 | Yamada et al. | |
| 6,130,494 A | | 10/2000 | Schöb | |
| 6,297,574 B1 | | 10/2001 | Schöb et al. | |
| 6,456,946 B1 | | 9/2002 | O'Gorman | |
| 6,504,336 B2 | | 1/2003 | Sakamaki | |
| 6,639,379 B2 | | 10/2003 | Matsushita et al. | |

(Continued)

FOREIGN PATENT DOCUMENTS

EP    1 609 695 A2    12/2005

(Continued)

OTHER PUBLICATIONS

U.S. Appl. No. 12/036,733, filed Feb. 25, 2008, Hiroshi Suzuki.

(Continued)

*Primary Examiner* — Bentsu Ro
(74) *Attorney, Agent, or Firm* — Oblon, Spivak, McClelland, Maier & Neustadt, L.L.P.

(57) ABSTRACT

A signal generating section includes a second calculating section that corrects phase resistance. The calculating section stores resistance values of phases that have been measured in advance and a reference resistance value. The calculating section calculates correction components, which cancel a voltage drop term of a voltage equation of a d-q coordinate system changing depending on the rotation angle of the motor, based on the stored resistance values and the reference resistance value. The signal generating section superimposes the correction component and the correction component on a d-axis voltage command value and a q-axis voltage command value, respectively. The d-axis voltage command value and the q-axis voltage command value are thus corrected in such a manner as to suppress a torque ripple caused by difference among the resistance values of the phases.

4 Claims, 6 Drawing Sheets

A: (2/3) xRdq_aa, B: (2/3) xRdq_ab, C: (2/3) xRdq_ba, D: (2/3) xRdq_bb

U.S. PATENT DOCUMENTS

| | | | |
|---|---|---|---|
| 6,741,060 | B2 | 5/2004 | Krefta et al. |
| 6,927,548 | B2 | 8/2005 | Nishizaki et al. |
| 7,005,822 | B1 | 2/2006 | O'Gorman et al. |
| 7,084,601 | B2 | 8/2006 | Maeda et al. |
| 7,091,684 | B2 | 8/2006 | Kobayashi et al. |
| 7,141,948 | B2 | 11/2006 | Kifuku et al. |
| 7,161,317 | B2 | 1/2007 | Matsushita et al. |
| 7,161,323 | B2 | 1/2007 | Ajima et al. |
| 7,188,702 | B2 | 3/2007 | Takagi et al. |
| 7,193,388 | B1 | 3/2007 | Skinner et al. |
| 7,199,538 | B2 | 4/2007 | Kameya |
| 7,240,761 | B2 | 7/2007 | Nagase et al. |
| 7,298,109 | B2 | 11/2007 | Sakamaki et al. |
| 7,321,216 | B2 | 1/2008 | Suzuki |
| 7,348,756 | B2 | 3/2008 | Ma et al. |
| 7,394,214 | B2 | 7/2008 | Endo et al. |
| 7,414,425 | B2 | 8/2008 | O'Gorman et al. |
| 7,439,693 | B2 | 10/2008 | Shoda et al. |
| 7,459,879 | B2 | 12/2008 | Kezobo et al. |
| 7,474,067 | B2 | 1/2009 | Ueda et al. |
| 2002/0145837 | A1 | 10/2002 | Krefta et al. |
| 2008/0067960 | A1 | 3/2008 | Maeda et al. |
| 2008/0185983 | A1 | 8/2008 | Suzuki |
| 2008/0203958 | A1 | 8/2008 | Suzuki |
| 2008/0203963 | A1 | 8/2008 | Suzuki |
| 2009/0192665 | A1 | 7/2009 | Nozawa |

FOREIGN PATENT DOCUMENTS

| | | |
|---|---|---|
| JP | 2005-119417 | 5/2005 |
| JP | 2005-170294 | 6/2005 |
| JP | 2007-131123 | 5/2007 |

OTHER PUBLICATIONS

U.S. Appl. No. 12/139,054, filed Jun. 13, 2008, Hiroshi Suzuki.

U.S. Appl. No. 12/128,304, filed May 28, 2008, Hiroshi Suzuki.

Notice of Allowance mailed Sep. 29, 2010 in co-pending U.S. Appl. No. 12/139,054.

U.S. Appl. No. 12/212,165, filed Sep. 17, 2008, Suzuki.

* cited by examiner

MOTOR CONTROLLER AND ELECTRIC POWER STEERING APPARATUS

This application is based on and claims priority from Japanese Patent Application No. 2007-249612 filed on Sep. 26, 2007, the entire contents of which are incorporated herein by reference.

BACKGROUND OF THE INVENTION

The present invention relates to a motor controller and an electric power steering apparatus.

Conventionally, a motor controller that controls a motor through supply of drive power of three phases (U, V, and W-phases) to the motor operates on the presumption that the resistance values of the phases are equal. Thus, on such presumption, the motor controller adjusts the voltages supplied to the phases in such a manner that the amounts of the electric currents flowing in the phases become equal. In other words, the motor controller adjusts the voltages supplied to the phases in such a manner that the waveforms of the electric currents of the phases have equal amplitudes and the sum of the electric currents of the phases at a common rotation angle becomes zero. However, in reality, the resistance values of the phases are not necessarily equal due to different lengths of cables or vary depending on whether failsafe phase opening relays are provided for the phases. This results in unequal electric currents flowing in the phases, causing a torque ripple. Normally, the phase opening relays are provided only for two of the three phases.

For example, a motor controller disclosed in Japanese Laid-Open Patent Publication No. 2005-170294 corrects the voltages of the two phases having the phase opening relays or the voltage of the phase without a phase opening relay so that the electric currents flowing in the phases become equal, taking the resistance values of the phase opening relays into account. This suppresses a torque ripple and allows smooth rotation of the motor.

However, the motor controller operates on the presumption that the resistance values of the phase opening relays and those of the phases are equal. This prevents the motor controller from performing appropriately if the resistance values of the phase opening relays are varied or the lengths of the cables are unequal among the phases. To solve this problem, the voltages of all of the three phases may be corrected. However, this increases calculation load and requires the use of a calculation device (a microcomputer) with higher performance, which raises the manufacturing cost.

SUMMARY OF THE INVENTION

Accordingly, it is an objective of the present invention to provide a motor controller and an electric power steering apparatus that suppress a torque ripple caused by unequal resistance values of phases, without increasing calculation load.

To achieve the foregoing objective and in accordance with a first aspect of the present invention, a motor controller having signal generating means that generates a motor control signal by performing an electric current feedback control in a d-q coordinate system, and a driver circuit that supplies a drive power of three phases to a motor based on the motor control signal is provided. The motor controller includes memory means that stores a resistance value of each one of the phases of the motor. The signal generating means corrects respective voltage command values of the d-q coordinate system based on the stored resistance values in such a manner as to suppress a torque ripple caused by a difference among the resistance values.

In accordance with a second aspect of the present invention, an electric power steering apparatus having the motor controller according to first aspect of the present invention is provided.

DETAILED DESCRIPTION OF THE PREFERRED EMBODIMENTS

An embodiment of the present invention, which is an electric power steering apparatus (an EPS), will now be described with reference to the attached drawings.

Figure 1:
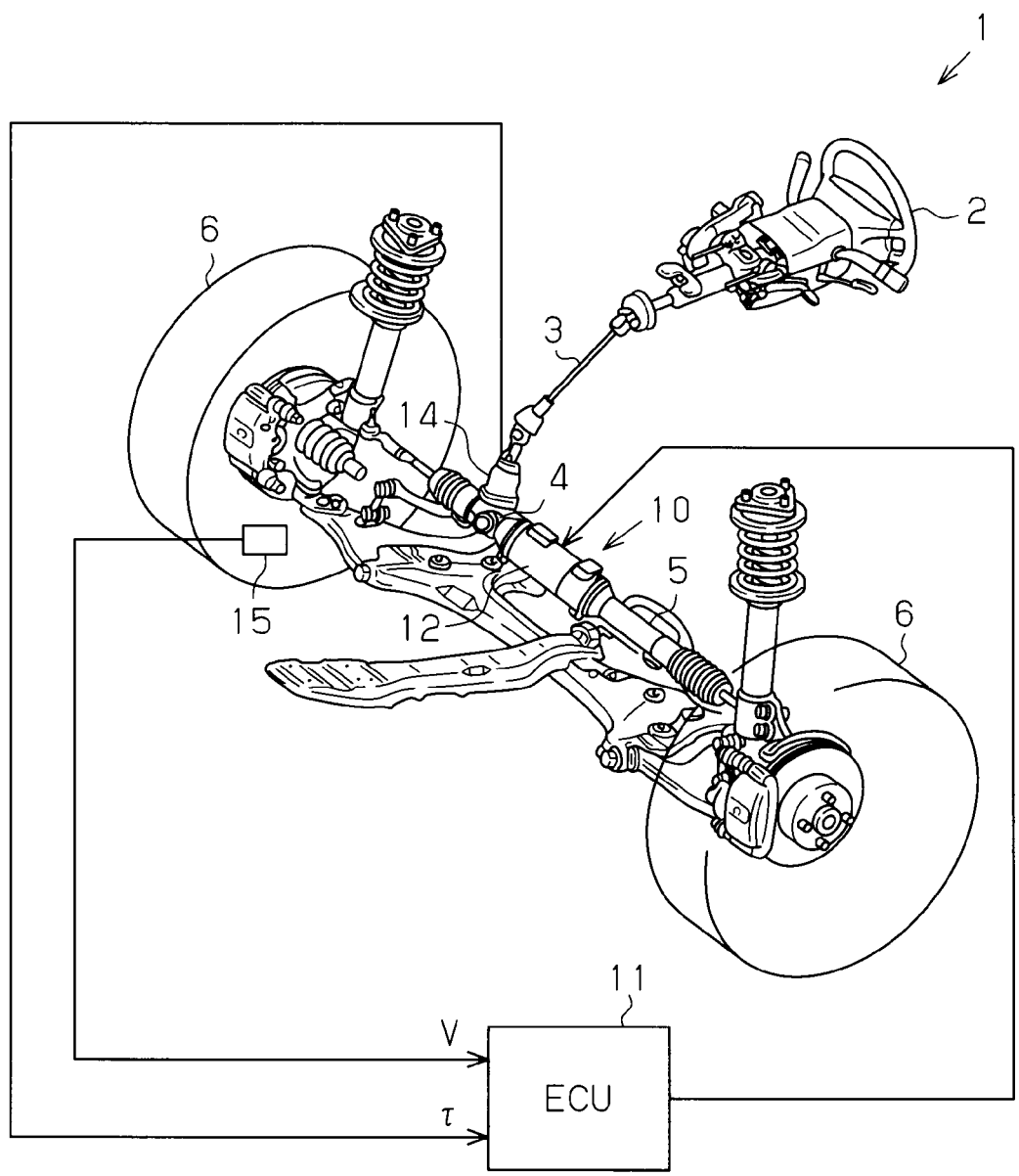
FIG. 1 is a perspective view schematically showing an electric power steering apparatus (EPS)

As shown in FIG. 1, a steering wheel 2 is fixed to a steering shaft 3. The steering shaft 3 is connected to a rack 5 through a rack-and-pinion mechanism 4. The steering shaft 3 is rotated through steering. The rotation of the steering shaft 3 is converted into linear reciprocation of the rack 5 through the rack-and-pinion mechanism 4. This changes steering angles of steerable wheels 6.

An EPS 1 has an EPS actuator 10 and an ECU 11. The EPS actuator 10 is a steering force assisting device that applies assist force to a steering system in order to assist steering. The ECU 11 is control means that controls operation of the EPS actuator 10.

The EPS actuator 10 is a rack type EPC actuator and is powered by a motor 12, or a drive source, which is arranged coaxially with the rack 5. In the EPS actuator 10, the motor 12 generates assist torque, which is transmitted to the rack 5 through a ball screw mechanism (not shown). The motor 12 is a brushless type and driven by three-phase (U, V, and W phases) drive power supplied from the ECU 11. The ECU 11 as a motor controller adjusts the assist force applied to the steering system by regulating the assist torque produced by the motor 12 (power assist control).

A torque sensor 14 and a vehicle speed sensor 15 are connected to the ECU 11. The ECU 11 operates the EPS actuator 10, or carries out the power assist control, based on a steering torque τ and a vehicle speed V, which are detected by the torque sensor 14 and the vehicle speed sensor 15, respectively.

The electrical configuration of the EPS 1 according to the present embodiment will hereafter be explained.

Figure 2:
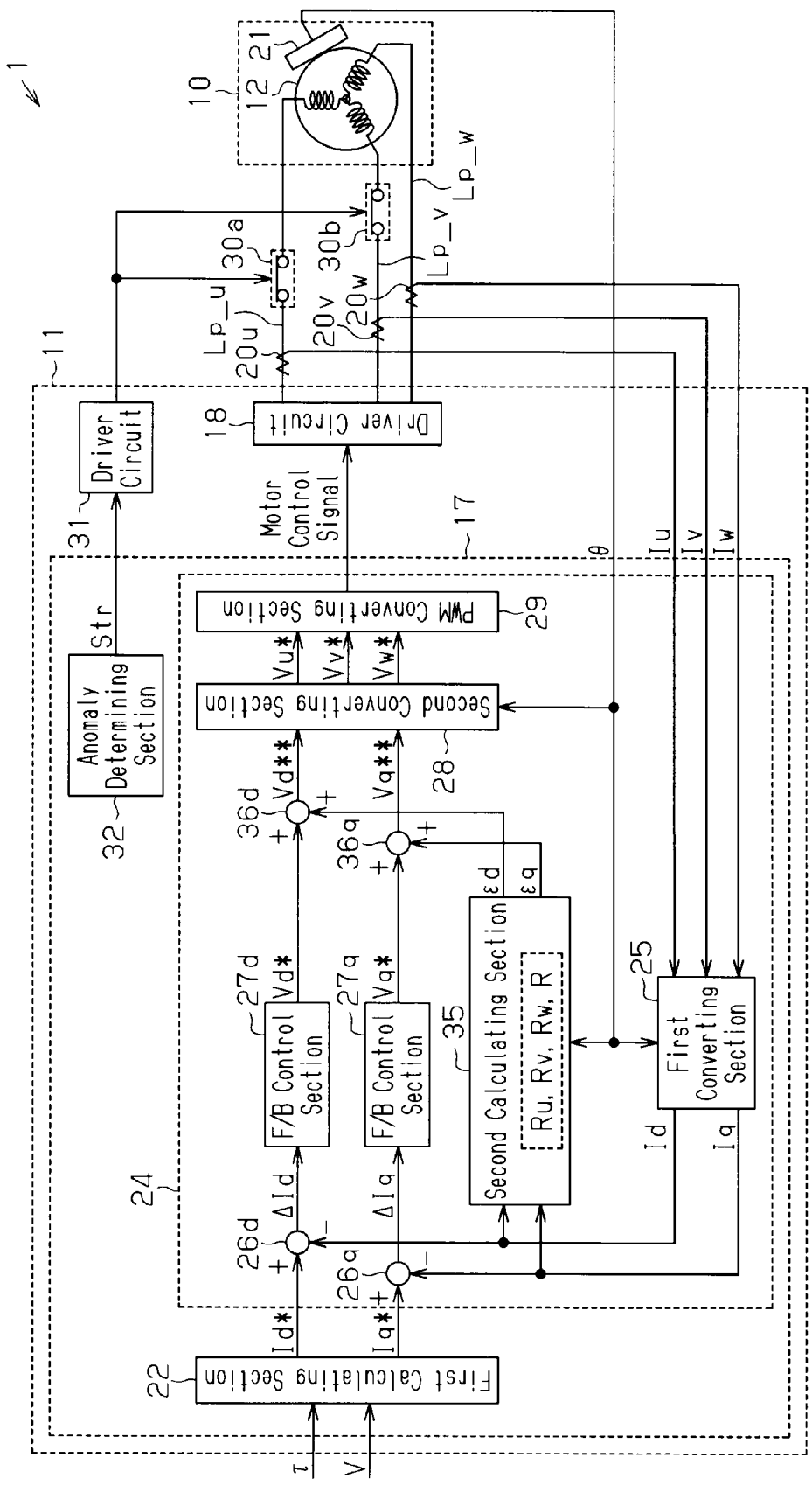
FIG. 2 is a block diagram representing the electric configuration of the EPS.

As illustrated in FIG. 2, the ECU 11 has a microcomputer 17 and a driver circuit 18. The microcomputer 17 is signal output means that outputs a motor control signal. The driver circuit 18 supplies the three-phase power to the motor 12 based on the motor control signal.

The driver circuit 18 is a publicly known PWM inverter that is configured by connecting three basic units (arms) corresponding to the respective phases in parallel. Each of the basic units is formed by a pair of switching elements that are connected in series. The motor control signal, which is output by the microcomputer 17, defines ON duty ratio of each of the switching elements, which form the driver circuit 18. When the motor control signal is provided to the gate terminal of each switching element, the switching element is turned selectively on and off in response to the motor control signal. This converts DC voltage of a power source (not shown) mounted in the vehicle to the three-phase (U, V, and W phases) drive power. The drive power is then supplied to the motor 12.

The ECU 11 has electric current sensors 20u, 20v, and 20w, which detect phase current values Iu, Iv, and Iw, respectively, and a rotation angle sensor 21 detecting a rotation angle θ of the motor 12. Based on the phase current values Iu, Iv, Iw and the rotation angle θ of the motor 12, which are detected based on detection signals of these sensors, and the steering torque τ and the vehicle speed V, the microcomputer 17 outputs the motor control signal to the driver circuit 18.

The microcomputer 17 includes a first calculating section 22, which calculates a current command value, and a signal generating section 24 serving as signal generating means. The first calculating section 22 calculates an electric current command value as a target control amount of the assist force applied to the steering system. The signal generating section 24 generates the motor control signal based on the electric current command value, which is provided by the first calculating section 22.

The first calculating section 22 calculates a d-axis current command value Id* and a q-axis current command value Iq* based on the steering torque τ and the vehicle speed V. The first calculating section 22 then outputs the obtained d-axis current command value Id* and q-axis current command value Iq* to the signal generating section 24. In normal control, the first calculating section 22 outputs "0" as the d-axis current command value Id* (Id*=0). Along with the d-axis current command value Id* and the q-axis current command value Iq*, the signal generating section 24 receives the phase current values Iu, Iv, Iw detected by the corresponding electric current sensors 20u, 20v, 20w and the rotation angle θ detected by the rotation angle sensor 21. Based on the phase current values Iu, Iv, Iw and the rotation angle θ (the electric angle), the signal generating section 24 generates the motor control signal by performing feedback control on electric currents in the d-q coordinate system.

Specifically, in the signal generating section 24, the phase current values Iu, Iv, Iw are input to the first converting section 25 serving as a three phase/two phase converting section, together with the rotation angle θ. The first converting section 25 converts the phase current values Iu, Iv, Iw into a d-axis current value Id and a q-axis current value Iq of a d/q coordinate system. A q-axis current command value Iq* is input to a 26q, together with the q-axis current value Iq. Also, a d-axis current command value Id* is input to a subtractor 26d together with the d-axis current value Id. A d-axis current deviation ΔId, which is calculated by the subtractor 26d, is sent to a F/B control section 27d. Also, a q-axis current deviation ΔIq, which is obtained by the subtractor 26q, is input to a F/B control section 27q. The F/B control section 27d performs feedback control to cause the d-axis current value Id, which represents the actual electric current, to follow the d-axis current command value Id*, which is a target control value. Similarly, the F/B control section 27q carries out feedback control to cause the q-axis current value Iq, which represents the actual electric current, to follow the q-axis current command value Iq*, which is a target control value.

Specifically, the F/B control section 27d obtains a d-axis voltage command value Vd* by multiplying the d-axis current deviation ΔId by a predetermined F/B gain (PI gain). The F/B control section 27q determines a q-axis voltage command value Vq* by multiplying the q-axis current deviation ΔIq by a predetermined F/B gain (PI gain). The d-axis voltage command value Vd* and the q-axis voltage command value Vq*, which are provided by the F/B control section 27d and the F/B control section 27q, respectively, are input to a second converting section 28, which is a two phase/three phase converting section 28, along with the rotation angle θ. The second converting section 28 converts the d-axis and q-axis voltage command values Vd*, Vq* into three phase voltage command values Vu*, Vv*, Vw*.

The voltage command values Vu*, Vv*, Vw* are input to a PWM converting section 29. The PWM converting section 29 generates duty command values corresponding to the voltage command values Vu*, Vv*, Vw*. The signal generating section 24 produces a motor control signal having an ON duty ratio represented by each of the duty command values. The microcomputer 17 outputs the motor control signal to the gate terminals of the switching terminals forming the driver circuit 18. In this manner, the microcomputer 17 controls operation of the driver circuit 18, or supply of drive power to the motor 12.

Power cables Lp_u, Lp_v, Lp_w are provided between the motor 12 and the driver circuit 18 in correspondence with the respective phases to connect the motor 12 to the driver circuit 18. A fail safe phase opening relay 30a is provided for the U-phase power cable Lp_u and a failsafe phase opening relay 30b is deployed for the V-phase power cable Lp_v. A driver circuit 31 is mounted in the ECU 11 in correspondence with the phase opening relays 30a, 30b. Specifically, the microcomputer 17 includes an anomaly determining section 32, which detects an anomaly of the system such as an overcurrent flowing to the motor 12. The driver circuit 31 operates to open the phase opening relays 30a, 30b in response to an anomaly signal Str output by the anomaly determining section 32. This blocks supply of the drive power to the motor 12, thus quickly performing failsafe control.

(Unequal Resistance Correction Control)

The unequal resistance correction control will hereafter be described.

As has been described, in an actual motor controller, the resistance values of the phases are not necessarily equal due to the different lengths of the cables or vary depending on whether the failsafe phase opening relays are provided for the respective phases. This leads to unequal electric currents flowing in the phases and may generate a torque ripple.

To solve this problem, the signal generating section 24 of the present embodiment corrects a d-axis voltage command value Vd* and a q-axis voltage command value Vq* of a d-q coordinate system in generation of a motor control signal in such a manner as to suppress a torque ripple caused by different resistance values of the phases.

Specifically, as illustrated in FIG. 2, the signal generating section 24 includes a second calculating section 35 that corrects phase resistance. The second calculating section 35 stores resistance values Ru, Rv, Rw of the respective phases that have been measured in advance and a reference resistance value R. In other words, in the present embodiment, the second calculating section 35 serves also as memory means. The resistance value Ru, Rv, Rw of each of the phases is a resistance value of the corresponding power supply line including the power cable Lp_u, Lp_v, and Lp_w and the opening relay 30a, 30b, which is provided in the associated power cable. The resistance values are measured in advance for each of the phases. However, the resistance values may be obtained from simulation. The reference resistance value R is the average of the measured resistance values Ru, Rv, Rw of the respective phases.

A d-axis electric current value Id and a q-axis electric current value Iq, which are actual electric current values, and a rotation angle θ of the motor 12 are input to the second calculating section 35. The second calculating section 35 calculates correction components εd, εq based on these condition amounts, the stored resistance values Ru, Rv, Rw of the phases, and the reference resistance value R.

The second calculating section 35 calculates the correction components εd, εq using the following expressions (1) and (2).

$$\varepsilon_d = \frac{2}{3}(R_{dq\_aa}I_d + R_{dq\_ab}I_q) \quad (1)$$

$$\varepsilon_q = \frac{2}{3}(R_{dq\_ba}I_d + R_{dq\_bb}I_q) \quad (2)$$

where $$R_{dq\_aa} = \Delta R_u \cos^2\theta + \Delta R_v \cos^2\left(\theta - \frac{2\pi}{3}\right) + \Delta R_w \cos^2\left(\theta + \frac{2\pi}{3}\right)$$

$$R_{dq\_ab} = R_{dq\_ba}$$
$$= -\Delta R_u \cos\theta\sin\theta - \Delta R_v \cos\left(\theta - \frac{2\pi}{3}\right)\sin\left(\theta - \frac{2\pi}{3}\right) -$$
$$\Delta R_w \cos\left(\theta + \frac{2\pi}{3}\right)\sin\left(\theta + \frac{2\pi}{3}\right)$$

$$R_{dq\_bb} = \Delta R_u \sin^2\theta + \Delta R_v \sin^2\left(\theta - \frac{2\pi}{3}\right) + \Delta R_w \sin^2\left(\theta + \frac{2\pi}{3}\right)$$

In the expressions (1) and (2), the values "ΔRu", "ΔRv", and "ΔRw" each indicate the difference between the corresponding one of the phase resistance values Ru, Rv, and Rw and the reference resistance value R.

The signal generating section 24 superimposes the correction component εd on the d-axis voltage command value Vd* by means of an adder 36d. The signal generating section 24 also superimposes the correction component εq on the q-axis voltage command value Vq* by means of an adder 36q. The d-axis voltage command value Vd* and the q-axis voltage command value Vq* are thus corrected.

Figure 3:
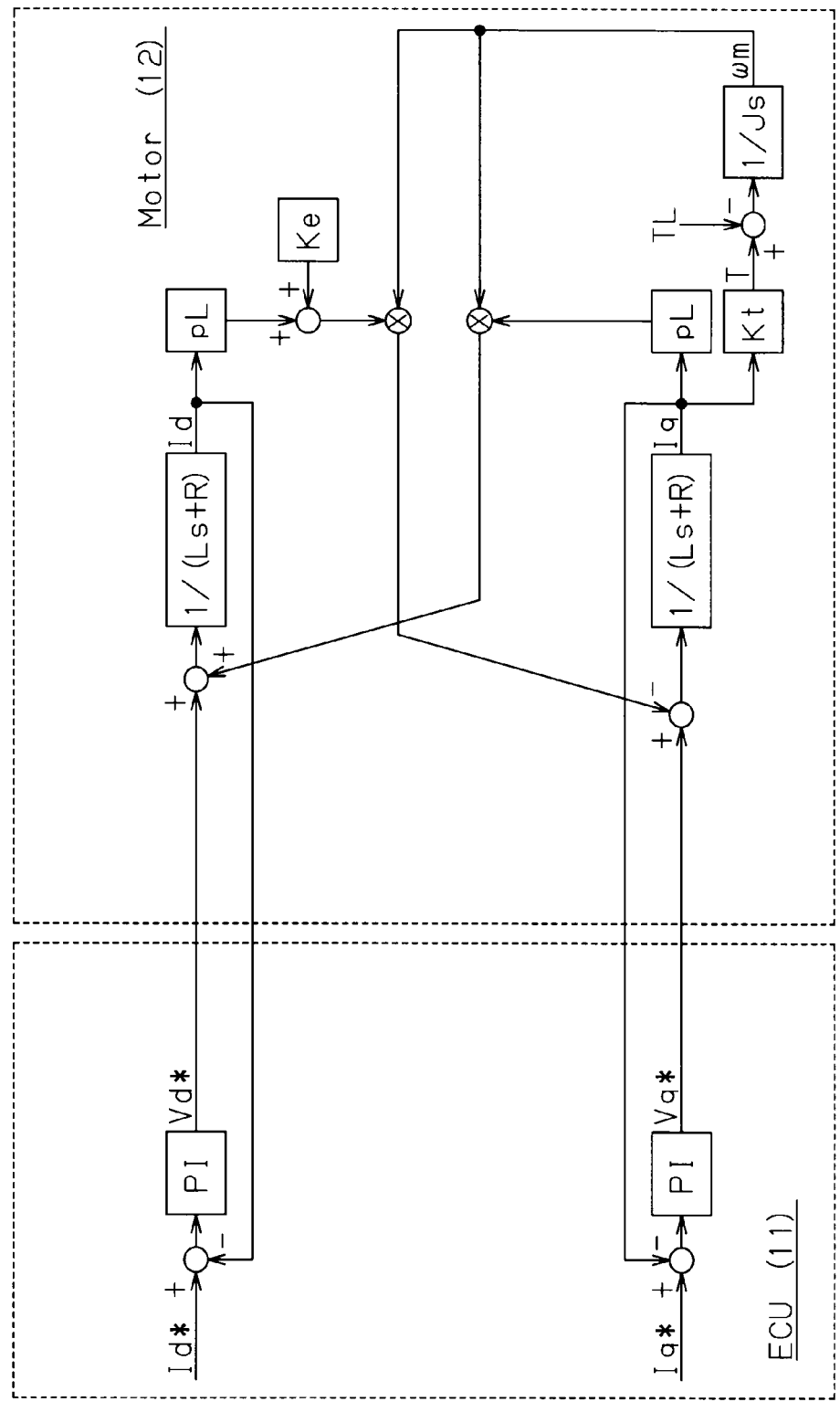
FIG. 3 is a block diagram representing a case in which the resistance values of the phases are equal.

More specifically, the voltage equation of the d-q coordinate system when "the resistance values Ru, Rv, Rw of the phases are equal" is represented by the following expression (3). FIG. 3 represents the block diagram corresponding to the voltage equation of the d-q coordinate system.

$$\begin{bmatrix}V_d \\ V_q\end{bmatrix} = \begin{bmatrix}R+sL & -p\omega_m L \\ p\omega_m L & R+sL\end{bmatrix}\begin{bmatrix}I_d \\ I_q\end{bmatrix} + \begin{bmatrix}0 \\ K_e\omega_m\end{bmatrix} \quad (3)$$

In the expression (3), "L" represents the inductance ("s" representing the differential operator), "p" represents the number of poles, "$\omega_m$" represents the motor rotation angle (mechanical angle), and "Ke" represents the back electromotive force constant.

The resistance value Ru, Rv, Rw of each phase is represented by the following expression (4) using the reference resistance value R and the difference ΔRu, ΔRv, and ΔRw between the resistance value Ru, Rv, and Rw and the reference resistance value R. By converting the differences ΔRu, ΔRv, and ΔRw into the d-q coordinate system using the expressions (5), (6), and (7), respectively, the expression (8) is obtained.

$$R_{uvw} = \begin{bmatrix}R_u & 0 & 0 \\ 0 & R_v & 0 \\ 0 & 0 & R_w\end{bmatrix} = \begin{bmatrix}\Delta R_u & 0 & 0 \\ 0 & \Delta R_v & 0 \\ 0 & 0 & \Delta R_w\end{bmatrix} + \begin{bmatrix}R & 0 & 0 \\ 0 & R & 0 \\ 0 & 0 & R\end{bmatrix} \quad (4)$$

$$R_{dq} = [C]\begin{bmatrix}\Delta R_u & 0 & 0 \\ 0 & \Delta R_v & 0 \\ 0 & 0 & \Delta R_w\end{bmatrix}[C]^{-1} + [C]\begin{bmatrix}R & 0 & 0 \\ 0 & R & 0 \\ 0 & 0 & R\end{bmatrix}[C]^{-1} \quad (5)$$

$$[C] = \sqrt{\frac{2}{3}}\begin{bmatrix}\cos\theta & \cos\left(\theta-\frac{2\pi}{3}\right) & \cos\left(\theta+\frac{2\pi}{2}\right) \\ -\sin\theta & \sin\left(\theta-\frac{2\pi}{3}\right) & \sin\left(\theta+\frac{2\pi}{3}\right)\end{bmatrix} \quad (6)$$

$$[C]^{-1} = \sqrt{\frac{2}{3}}\begin{bmatrix}\cos\theta & -\sin\theta \\ \cos\left(\theta-\frac{2\pi}{3}\right) & -\sin\left(\theta-\frac{2\pi}{3}\right) \\ \cos\left(\theta+\frac{2\pi}{3}\right) & -\sin\left(\theta+\frac{2\pi}{3}\right)\end{bmatrix} \quad (7)$$

$$R_{dq} = \frac{2}{3}\begin{bmatrix}R_{dq\_aa} & R_{dq\_ab} \\ R_{dq\_ba} & R_{dq\_bb}\end{bmatrix} + \begin{bmatrix}R & 0 \\ 0 & R\end{bmatrix} \quad (8)$$

where $$R_{dq\_aa} = \Delta R_u \cos^2\theta + \Delta R_v \cos^2\left(\theta - \frac{2\pi}{3}\right) + \Delta R_w \cos^2\left(\theta + \frac{2\pi}{3}\right)$$

$$R_{dq\_ab} = R_{dq\_ba} = -\Delta R_u \cos\theta\sin\theta -$$
$$\Delta R_v \cos\left(\theta - \frac{2\pi}{3}\right)\sin\left(\theta - \frac{2\pi}{3}\right) - \Delta R_w \cos\left(\theta + \frac{2\pi}{3}\right)\sin\left(\theta + \frac{2\pi}{3}\right)$$

$$R_{dq\_bb} = \Delta R_u \sin^2\theta + \Delta R_v \sin^2\left(\theta - \frac{2\pi}{3}\right) + \Delta R_w \sin^2\left(\theta + \frac{2\pi}{3}\right)$$

Figure 4:
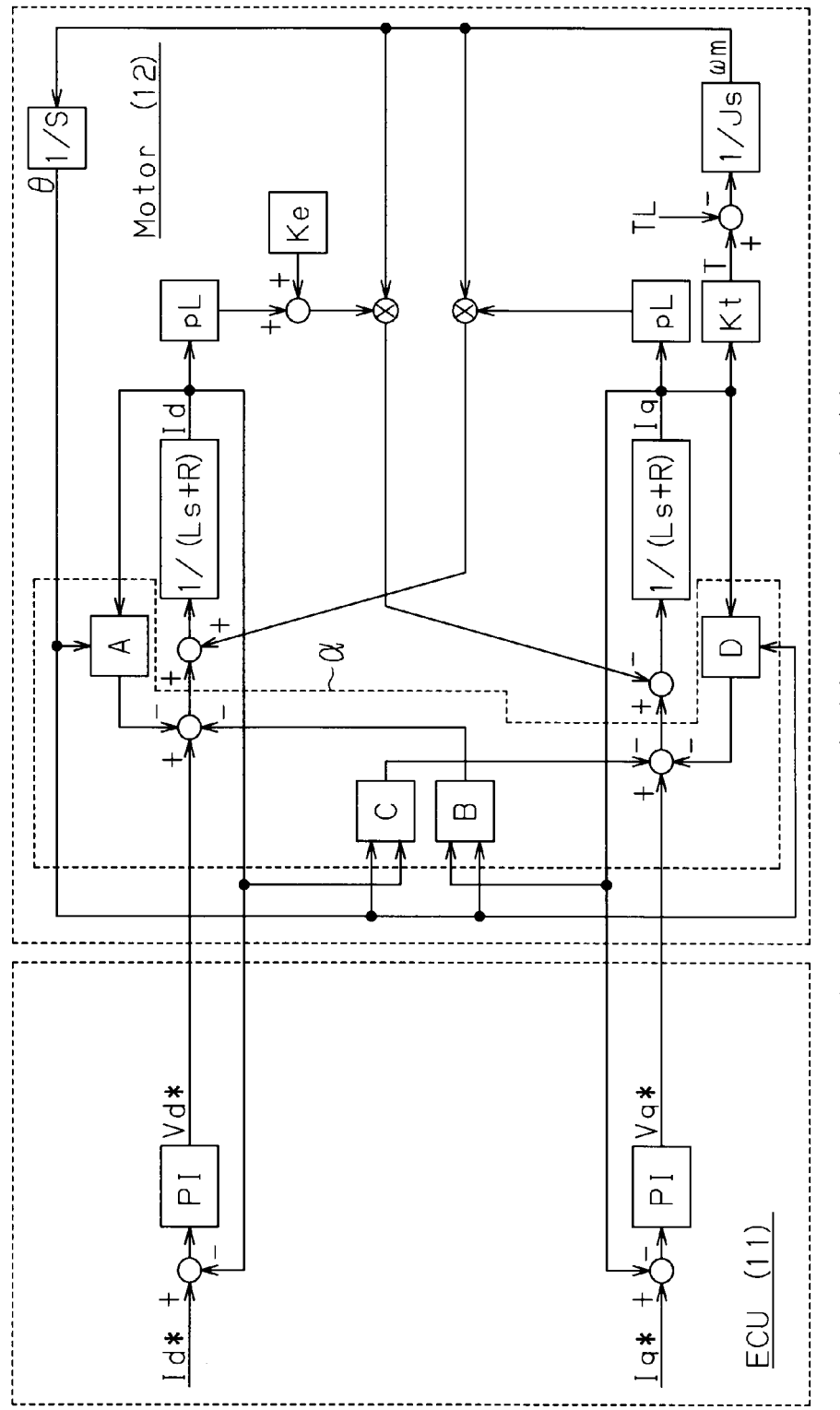
FIG. 4 is a block diagram representing a case in which the resistance values of the phases are unequal.

Accordingly, the voltage equation of the d-q coordinate system when "the resistances of the phases are unequal" is represented by the following expression (9). FIG. 4 represents the block diagram corresponding to the voltage equation of the d-q coordinate system of this case. In FIG. 4, each of the blocks "A", "B", "C", and "D" surrounded by the chain lines α is obtained by multiplying the corresponding one of "Rdq_aa", "Rdq_ab", "Rdq_ba", and "Rdq_bb" of the expression (9) by two-thirds.

$$\begin{bmatrix}V_d \\ V_q\end{bmatrix} = \frac{2}{3}\begin{bmatrix}R_{dq\_aa} & R_{dq\_ab} \\ R_{dq\_ba} & R_{dq\_bb}\end{bmatrix}\begin{bmatrix}I_d \\ I_q\end{bmatrix} + \begin{bmatrix}R+sL & -p\omega_m L \\ p\omega_m L & R+sL\end{bmatrix}\begin{bmatrix}I_d \\ I_q\end{bmatrix} + \begin{bmatrix}0 \\ K_e\omega_m\end{bmatrix} \quad (9)$$

Specifically, as represented by the expression (9) and FIG. 4, when the resistances of the phases are unequal, the interference component caused by the differences ΔRu, ΔRv, ΔRw between the resistance values of the phases and the reference resistance value R becomes a voltage drop term (the first term of the expression (9) and each block "A", "B", "C", and "D" surrounded by the chain lines a in FIG. 4), unlike the case in which the resistance values Ru, Rv, Rw of the phases are equal, as represented by the expression (3) and FIG. 3. If unequal resistances act in the phases, a torque ripple is caused by change of the voltage drop term depending on the rotation angle of the motor 12, as represented by the expression (8).

Figure 5:
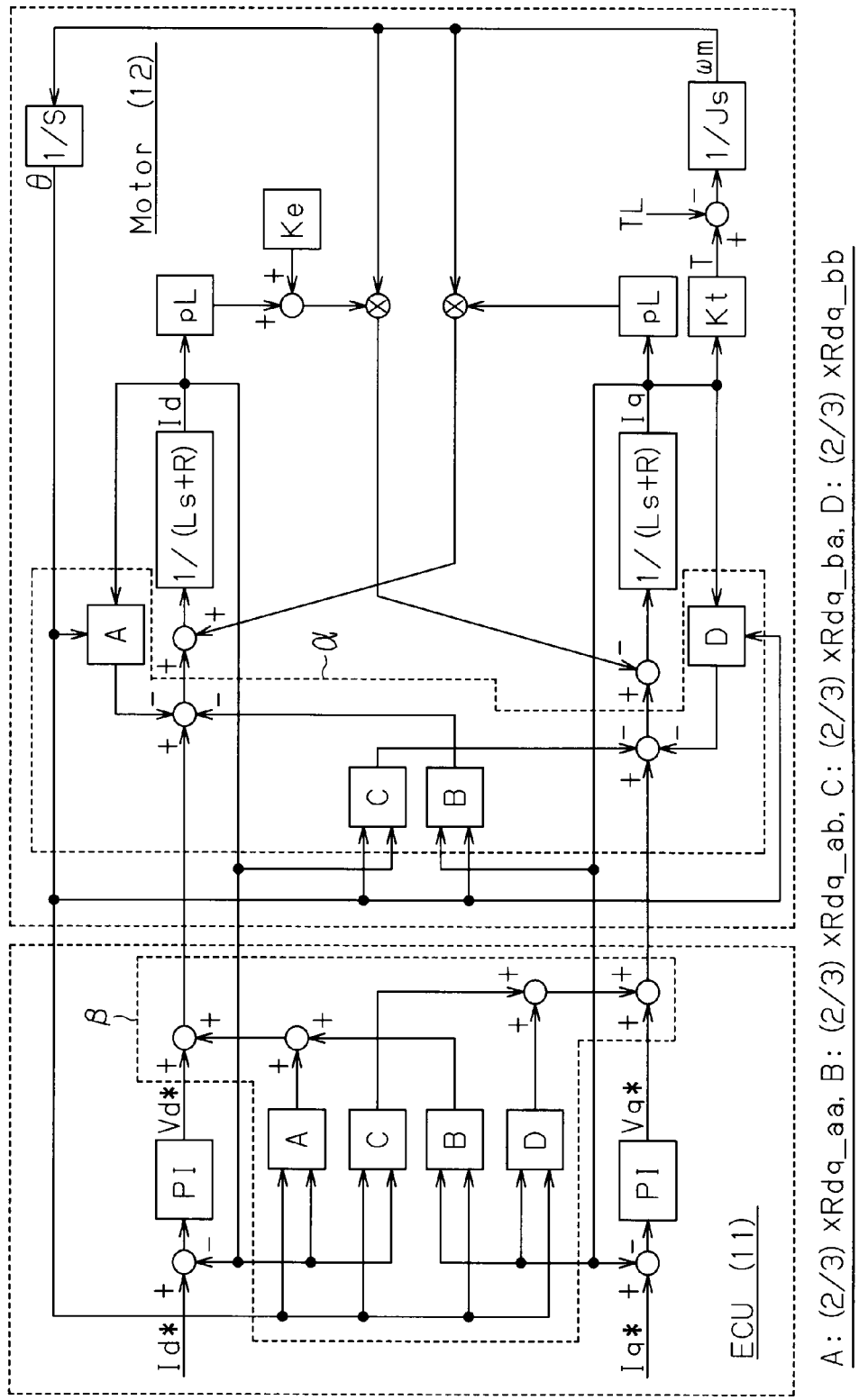
FIG. 5 is a block diagram representing a case in which correction is performed according to an embodiment of the present invention.

In other words, in the d-q coordinate system in which the motor voltage and the motor current are treated as a two-axis direct current amount, a ripple component caused by the unequal resistances of the phases manifests itself as an alternating current component. In the present embodiment, as represented in the block diagram of FIG. 5, the correction components (the blocks "A", "B", "C", and "D" surrounded by the chain lines β corresponding to the ECU 11 in FIG. 5), which cancels the alternating current components (the blocks "A", B, "C", and "D" surrounded by the chain lines α corresponding to the motor 12 in FIG. 5), are superimposed on the d-axis voltage command value Vd* and the q-axis voltage command value Vq*. That is, by superimposing the correction components ϵd, ϵq, which are represented by the expressions (1) and (2), on the d-axis voltage command value Vd* and the q-axis voltage command value Vq*, respectively, a torque ripple caused by the unequal resistances of the phases is suppressed.

As has been described, in the present embodiment, the torque ripple caused by the unequal resistances of the phases is suppressed with improved accuracy and the motor is rotated smoothly. Further, since correction is completed on the two axes, which are the d axis and the q axis, calculation load is decreased compared to a method in which the correction is performed on the voltages of the three phases, or the U, V, and W phases. This makes it unnecessary to use a high-performance calculation device (microcomputer), thus preventing a rise in the cost.

The present embodiment may be modified to the following forms.

In the above illustrated embodiment, the present invention may be embodied as a motor controller that is used for purposes other than the electric power steering apparatus (EPS).

Figure 6:
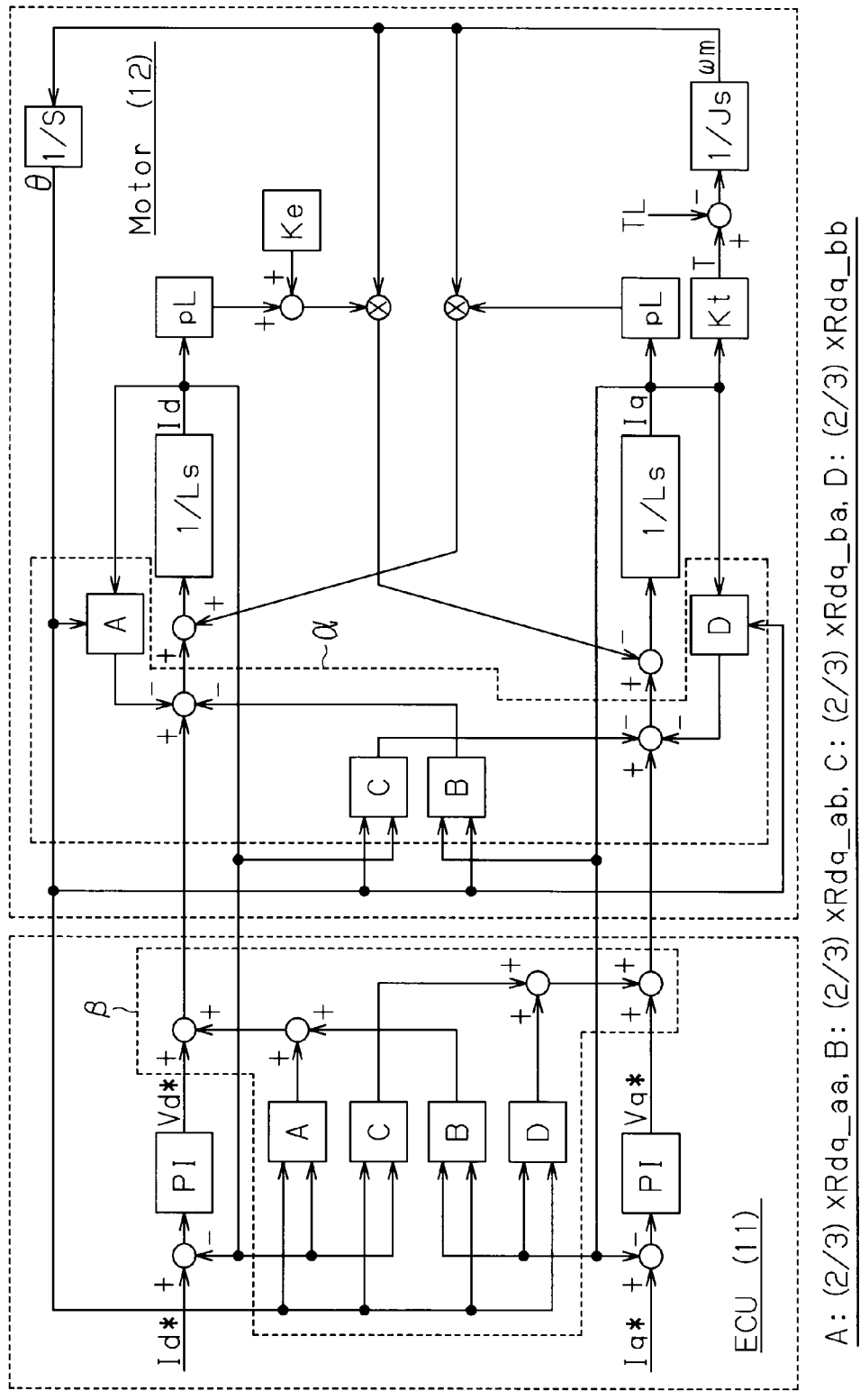
FIG. 6 is a block diagram representing a case in which correction of performed according to a modification.

In the above illustrated embodiment, the interference component caused by the difference ΔRu, ΔRv, ΔRw between the resistance value of each phase and the reference resistance value R is employed as the alternating current component that manifests itself on the d-q coordinate system. The correction component that cancels the interference component is superimposed on the d-axis voltage command value Vd* and the q-axis voltage command value Vq* each. However, the interference component caused by the resistance value Ru, Rv, Rw of each phase, which includes the difference ΔRu, ΔRv, ΔRw between the resistance value of the phase and the reference resistance value R and the reference resistance value R, may be employed. The correction component that cancels such interference component is superimposed on the d-axis voltage command value Vd* and the q-axis voltage command value Vq* each. In this case, the expression (9) is modified to the following expression (10). The block diagram corresponding to this case is represented in FIG. 6.

$$\begin{bmatrix} V_d \\ V_q \end{bmatrix} = \frac{2}{3}\begin{bmatrix} R_{dq\_aa} & R_{dq\_ab} \\ R_{dq\_ba} & R_{dq\_bb} \end{bmatrix}\begin{bmatrix} I_d \\ I_q \end{bmatrix} + \begin{bmatrix} sL & -p\omega_m L \\ p\omega_m L & sL \end{bmatrix}\begin{bmatrix} I_d \\ I_q \end{bmatrix} + \begin{bmatrix} 0 \\ K_e\omega_m \end{bmatrix} \quad (10)$$

where $$R_{dq\_aa} = R_u\cos^2\theta + R_v\cos^2\left(\theta - \frac{2\pi}{3}\right) + R_w\cos^2\left(\theta + \frac{2\pi}{3}\right)$$

$$R_{dq\_ab} = R_{dq\_ba} = -R_u\cos\theta\sin\theta -$$

$$R_v\cos\left(\theta - \frac{2\pi}{3}\right)\sin\left(\theta - \frac{2\pi}{3}\right) - R_w\cos\left(\theta + \frac{2\pi}{3}\right)\sin\left(\theta + \frac{2\pi}{3}\right)$$

-continued $$R_{dq\_bb} = R_u\sin^2\theta + R_v\sin^2\left(\theta - \frac{2\pi}{3}\right) + R_w\sin^2\left(\theta + \frac{2\pi}{3}\right)$$

In the above illustrated embodiment, the second calculating section 35 stores the resistance values Ru, Rv, Rw of the phases that are measured in advance and the reference resistance value R. However, the second calculating section 35 may store the differences ΔRu, ΔRv, ΔRw between the resistance values of the phases and the reference resistance value R, and the reference resistance value R. Further, although the average of the measured resistance values Ru, Rv, Rw of the phases is used as the reference resistance value R in the illustrated embodiment, any one of the resistance values Ru, Rv, Rw of the phases may be employed as the reference resistance value R.

In the illustrated embodiment, the second calculating section 35 calculates the correction components ϵd, ϵq based on the d-axis electric current value Id and the q-axis electric current value Iq (see the expressions (1) and (2)). However, the correction components ϵd, ϵq may be obtained using the d-axis electric current command value Id* and the q-axis electric current command value Iq*. Also in this case, advantages equivalent to the advantages of the above illustrated embodiment are ensured.

It is preferred that the present invention be used in a controller that corrects the temperature in correspondence with the resistance values Ru, Rv, Rw of the phases. In other words, if the resistances are unequal in the phases, the differences among the resistances may be increased due to change of the temperature. Thus, a more pronounced advantage of the invention may be obtained when the invention is used in combination with correction of the temperature.

The invention claimed is:

1. A motor controller having signal generating means that generates a motor control signal by performing an electric current feedback control in a d-q coordinate system, and a driver circuit that supplies a drive power of three phases to a motor based on the motor control signal, the motor controller comprising:
   memory means that stores a resistance value of each one of the phases of the motor,
   wherein the signal generating means corrects respective voltage command values of the d-q coordinate system based on the stored resistance values in such a manner as to suppress a torque ripple caused by a difference among the resistance values.

2. The motor controller according to claim 1, wherein each one of the voltage command values of the d-q coordinate system is corrected by superimposing a correction component that cancels a voltage drop term of a voltage equation of the d-q coordinate system, the voltage drop term changing depending on a rotation angle of the motor.

3. The motor controller according to claim 1, wherein each one of the resistance values of the phases stored in the memory means is a resistance value of a power supply line including a power cable connecting the motor to the driver circuit and a phase opening relay arranged in the power cable, the resistance value having been measured in advance for each of the phases.

4. An electric power steering apparatus comprising the motor controller according to claim 1.

* * * * *